United States Patent
Mays, II et al.

(10) Patent No.: US 9,629,206 B1
(45) Date of Patent: Apr. 18, 2017

(54) REDUCING OUTPUT RIPPLE CURRENT AND PROTECTING INVERTER SWITCHES DURING NON-ZERO VOLTAGE SWITCHING FOR ISOLATED BUCK CONVERTERS

(75) Inventors: Stephen D. Mays, II, Madison, AL (US); John J Dernovsek, Madison, AL (US); Philip Walker, Manchester, TN (US); Donald Folker, Madison, AL (US)

(73) Assignee: UNIVERSAL LIGHTING TECHNOLOGIES, INC., Madison, AL (US)

( * ) Notice: Subject to any disclaimer, the term of this patent is extended or adjusted under 35 U.S.C. 154(b) by 13 days.

(21) Appl. No.: 13/483,541

(22) Filed: May 30, 2012

Related U.S. Application Data

(60) Provisional application No. 61/636,805, filed on Apr. 23, 2012.

(51) Int. Cl.
*H05B 33/08* (2006.01)

(52) U.S. Cl.
CPC ................. *H05B 33/0803* (2013.01)

(58) Field of Classification Search
CPC ............ H05B 33/0839; H05B 33/0818; H05B 33/0848; H05B 33/0845; H02J 1/102; H02J 1/02; H02M 1/14; H02M 31/156
USPC .............. 315/205, 291, 297, 307, 308, 294; 323/282, 271; 318/254, 490; 321/178
See application file for complete search history.

(56) References Cited

U.S. PATENT DOCUMENTS

| | | | |
|---|---|---|---|
| 6,577,110 B2* | 6/2003 | Van Auken | 323/282 |
| 6,628,093 B2* | 9/2003 | Stevens | 315/291 |
| 2004/0036452 A1* | 2/2004 | Brooks et al. | 323/237 |
| 2004/0041543 A1* | 3/2004 | Brooks et al. | 323/212 |
| 2004/0041544 A1* | 3/2004 | Brooks et al. | 323/212 |
| 2006/0022653 A1* | 2/2006 | Reed et al. | 323/282 |
| 2007/0080671 A1* | 4/2007 | Qahouq et al. | 323/282 |
| 2007/0247091 A1* | 10/2007 | Maiocchi | 318/254 |
| 2008/0018261 A1* | 1/2008 | Kastner | 315/192 |

(Continued)

OTHER PUBLICATIONS

Step-gap "E" core swing chokes, 2001, Magnetics, Spang & company, pp. 1-2.*

(Continued)

*Primary Examiner* — Douglas W Owens
*Assistant Examiner* — Syed M Kaiser
(74) *Attorney, Agent, or Firm* — Patterson Intellectual Property Law, PC; Mark J. Patterson; Grant M. Ford

(57) ABSTRACT

An isolated buck converter protects inverter switches during non-zero voltage switching and reduces output ripple current by maintaining operation of an output inductor of the isolated buck converter in a continuous current mode. Continuous current mode operation is maintained by various combinations of: shifting the frequency of operation of the inverter switches of the isolated buck converter as a function of output current of the isolated buck converter; employing pulse density modulation to decrease the off time of the isolated buck converter which will decrease the magnitude of the current ripple; and use a step gap core (i.e., a swinging choke) for the output inductor that saturates to a lower value of inductance for high load current and a higher value of inductance at low load current.

20 Claims, 4 Drawing Sheets

(56) References Cited

U.S. PATENT DOCUMENTS

| | | | | |
|---|---|---|---|---|
| 2009/0302779 | A1* | 12/2009 | McKinney | 315/294 |
| 2011/0109363 | A1* | 5/2011 | Chen et al. | 327/178 |
| 2011/0234106 | A1* | 9/2011 | Wang et al. | 315/137 |
| 2011/0291574 | A1* | 12/2011 | Ji et al. | 315/187 |
| 2013/0021008 | A1* | 1/2013 | Hume et al. | 323/271 |
| 2013/0271040 | A1* | 10/2013 | Chen et al. | 315/307 |

OTHER PUBLICATIONS

Hangseok Choi, Design Considerations for Asymmetric Half-Bridge Converters, 2008-2009, pp. 3-4.*
Switched Mode Power Supplies, 1994, Power Semiconductor Applications Laboratory, of the Philips Semiconductors product division, p. 122.*

* cited by examiner

REDUCING OUTPUT RIPPLE CURRENT AND PROTECTING INVERTER SWITCHES DURING NON-ZERO VOLTAGE SWITCHING FOR ISOLATED BUCK CONVERTERS

CROSS-REFERENCES TO RELATED APPLICATIONS

This application claims benefit of the following patent application which is hereby incorporated by reference: U.S. Provisional Patent Application No. 61/636,805 filed Apr. 23, 2012, for "Method to Reduce Output Ripple Current and Simultaneously Protect Inverter Switches During Non Zero Voltage Switching for Isolated buck Converters."

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present invention relates generally circuits and methods for operating isolated buck converters to maintain continuous current mode operation. More particularly, the present invention pertains to maintaining continuous current mode operation in a buck converter while protecting inverter switches during non-zero voltage switching.

Operating an isolated buck converter at low output levels (i.e., low output current) can cause an output inductor of the isolated buck converter to operate in a discontinuous current mode. This places additional burden on an output capacitor of the isolated buck converter to attenuate output voltage and current ripple. Allowing the output inductor to operate in the discontinuous current mode causes the inverter switches in the isolated buck converter to switch much faster than normal, potentially creating a high current cross-conduction event that can destroy the inverter switches due to excessive current and temperatures.

BRIEF SUMMARY OF THE INVENTION

In one aspect, the inverter switches of an isolated buck converter are operated in a way that prevents the switches from cross-conducting and decreases output current ripple while operating the isolated buck converter at low output current levels.

In another aspect, an isolated buck converter that receives a direct current (DC) voltage from a power source and provides a substantially DC output voltage to a load includes a high switch, a low switch, a high bulk capacitor, a low bulk capacitor, an isolating transformer, a rectifier, an output inductor, and a switch controller. The high switch is connected to the power source. The low switch is connected to the high switch and a ground of the power source. The connection between the high switch and the low switch forms a first junction. The high bulk capacitor is connected to the power source. The low bulk capacitor is connected to the high bulk capacitor and the ground of the power source. The connection between the high bulk capacitor and the low bulk capacitor forms a second junction. The isolating transformer includes a primary winding and a secondary winding. The primary winding is connected between the first junction and the second junction. The rectifier is connected to the secondary winding of the isolating transformer. The output inductor is connected to an output of the rectifier. The output inductor provides a DC output voltage to the load. The switch controller is connected to the high switch and the low switch. The switch controller controls the high switch and a low switch via pulse width modulation and increases the frequency of the pulse width modulation as a current from the output inductor to the load decreases, to maintain the output inductor in a continuous current mode.

In a further aspect, an isolated buck converter receives a direct current (DC) voltage from a power source and provides a substantially DC output voltage to a load, and includes a high switch, a low switch, a high bulk capacitor, a low bulk capacitor, an isolating transformer, a rectifier, an output inductor, and a switch controller. The high switch is connected to the power source. The low switch is connected to the high switch and a ground of the power source. The connection between the high switch and the low switch forms a first junction. The high bulk capacitor is connected to the power source. The low bulk capacitor is connected to the high bulk capacitor and the ground of the power source. The connection between the high bulk capacitor and the low bulk capacitor forms a second junction. The isolating transformer includes a primary winding and a secondary winding. The primary winding is connected between the first junction and the second junction. The rectifier is connected to the secondary winding of the isolating transformer. The output inductor is connected to an output of the rectifier and provides a DC output voltage to the load. The output inductor includes a step-core selected to saturate at a low inductance when the current from the output inductor to the load exceeds a predetermined threshold and provide a high inductance when the current from the output inductor to the load is less than the predetermined threshold. The switch controller is connected to the high switch and the low switch and controls the high switch and the low switch via pulse width modulation.

In another aspect, a light fixture is operable to receive power from a power source and provide light. The light fixture includes a light source, an isolated buck converter, and a housing. The light source is operable to provide light in response to receiving a direct current (DC) voltage. The isolated buck converter receives a direct current (DC) voltage from a power source and provides a substantially DC output voltage to a light source. The isolated buck converter includes a high switch, a low switch, a high bulk capacitor, a low bulk capacitor, an isolating transformer, a rectifier, an output inductor, and a switch controller. The high switch is connected to the power source. The low switch is connected to the high switch and a ground of the power source. The connection between the high switch and the low switch forms a first junction. The high bulk capacitor is connected to the power source. The low bulk capacitor is connected to the high bulk capacitor and the ground of the power source. The connection between the high bulk capacitor and the low bulk capacitor forms a second junction. The isolating transformer includes a primary winding and a secondary winding. The primary winding is connected between the first junction and the second junction. The rectifier is connected to the secondary winding of the isolating transformer. The output inductor is connected to an output of the rectifier to provide a DC output voltage to the light source. The output inductor includes a step-core selected to saturate at a low inductance when the current from the output inductor to the light source exceeds a predetermined threshold and provide a high inductance when the current from the output inductor to the light source is less than the predetermined threshold. The switch controller controls the high switch and the low switch via pulse width modulation and increases the frequency of the pulse width modulation as a current from the output inductor to the light source decreases to maintain the output inductor in a continuous current mode. The housing is connected to the light source and the isolated buck converter.

DETAILED DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of the embodiments described herein, a number of terms are defined below. The terms defined herein have meanings as commonly understood by a person of ordinary skill in the areas relevant to the present invention. Terms such as "a," "an," and "the" are not intended to refer to only a singular entity, but rather include the general class of which a specific example may be used for illustration. The terminology herein is used to describe specific embodiments of the invention, but their usage does not delimit the invention, except as set forth in the claims.

As used herein, "ballast" and "light source driver circuit" refer to any circuit for providing power from a power source to a light source. Additionally, "light source" refers to one or more light emitting devices such as fluorescent lamps, high intensity discharge lamps, incandescent bulbs, and solid state light-emitting elements such as light emitting diodes (LEDs), organic light emitting diodes, and plasmaloids.

Figure 1:
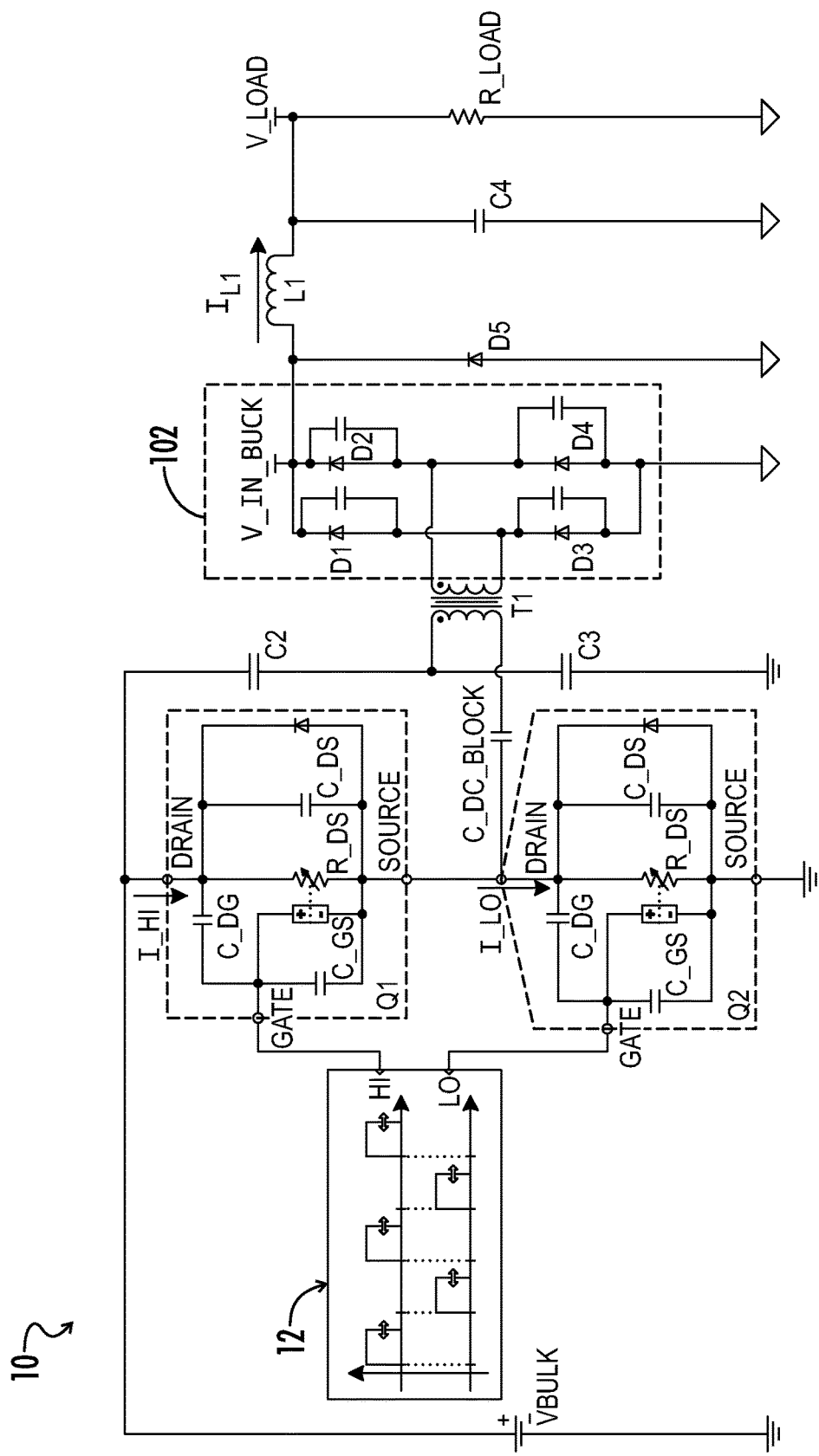
FIG. 1 is a schematic diagram of an embodiment of an isolated buck converter including functional models for a high side switch, a low side switch, and a rectifier of the isolated buck converter.

Referring to FIG. 1, an isolated buck DC-to-DC converter 10 is designed to operate far from resonance which causes the inverter of the isolated buck DC-to-DC converter 10 to switch at a non-zero voltage state. As a result, resetting the drain-to-gate capacitances C_DG and drain-to-source capacitances C_DS in the inverter switches (i.e., high switch Q1 and low switch Q2) causes a large input current surge and large dV/dt in the high switch Q1 and low switch Q2.

The output inductor L1 can operate in three different modes: continuous current mode, transition current mode, and discontinuous current mode.

A switch controller 502 (see FIG. 4) controls the inverter of the converter 10 including the high switch Q1 and the low switch Q2 via a pulse width modulated signal 12. When the inverter switches Q1 and Q2 are open, current $I_{L1}$ to the load (i.e. R_LOAD) from the output inductor L1 is shunted by the diodes of the full wave rectifier 102 (i.e. a first diode D1, a second diode D2, a third diode D3, and a fourth diode D4) and a freewheeling diode D5. When either the high switch Q1 or the low switch Q2 is turned on, the output current $I_{L1}$ is allowed to flow through the isolating transformer T1 and into the switch that is on. Because the isolating transformer T1 is terminated to one-half of the input voltage (i.e. VBULK) and the output current $I_{L1}$ flows only in one direction, transformed output current (i.e., current in the primary winding of the isolating transformer T1 induced by the output current IL1) will always flow into the positive-most terminal of each active inverter switch. If the half-bridge inverter of the isolated buck converter 10 uses a MOSFET for high switch Q1 and low switch Q2, transformed output current (i.e., current in the primary winding of the isolating transformer T1 induced by the output current IL1) will always flow into the drain of the active inverter switch.

Figure 2:
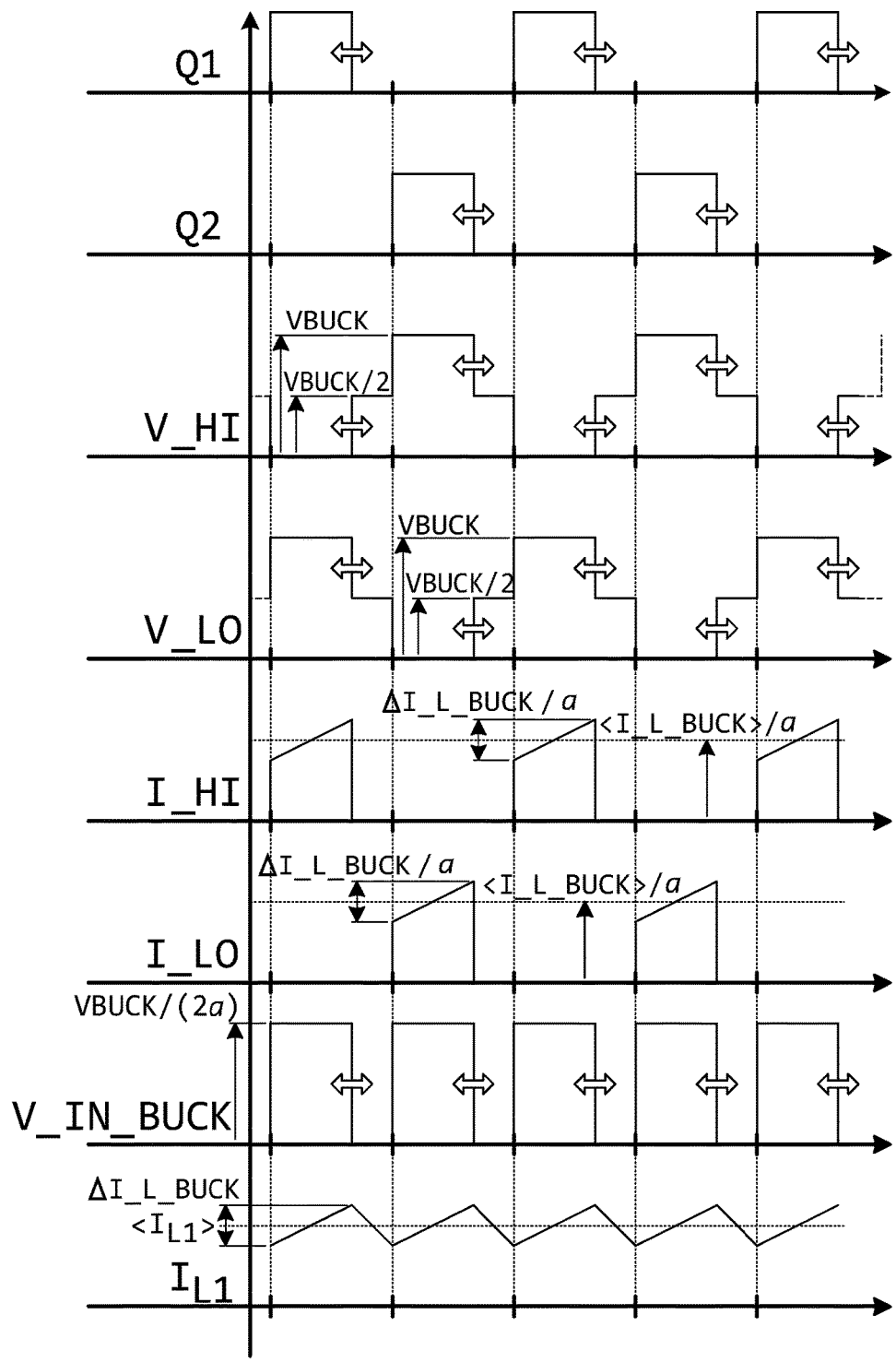
FIG. 2 is a timing diagram corresponding to the isolated buck converter of FIG. 1.

Referring to FIG. 2, a timing diagram for the isolated buck converter 10 of FIG. 1 is shown. The value of "a" in FIG. 2 is the ratio of turns in the primary winding to the turns in the secondary winding of the isolating transformer T1. The charges developed across each inverter switch Q1 and Q2 at every stage of the conversion are equal to the product of the voltage across the switch and the internal capacitances of the switch. When the inverter switch is turned on, the developed charge must be dissipated in the switch. When the switch is turned off, then the charge must be established. When this happens, a large current must flow from the power source (i.e., VBULK).

Referring again to FIG. 1, when both the high switch Q1 and the low switch Q2 are turned off, the output voltage of the rectifier 102 (i.e., V_IN_BUCK) goes negative by approximately one PN junction diode drop and output current $I_{L1}$ decreases. If the output current $I_{L1}$ is allowed to decrease to zero, the output voltage of the rectifier 102 (i.e., V_IN_BUCK) will drift up to the voltage across the load (i.e. an output voltage of the isolated buck converter V_LOAD) developing the charge across each of the diodes of the rectifier 102 (i.e., across the internal capacitance of each diode D1, D2, D3, and D4).

When the low switch Q2 is turned on, the drain and source connection of the two switches Q1 and Q2 approaches the zero reference which causes the charge stored in the internal capacitances (i.e., C_DS and C_GS) of the high switch Q1 to reset. Resetting the charges requires a large surge current to flow into the drain terminal of the high switch Q1 and out of the source and gate terminals of the high switch Q1. Any finite resistance between the gate and source terminals of the high switch Q1 will cause some portion of current to flow into the internal gate to source capacitance (i.e., C_GS) of the high switch Q1 which can turn on the high switch Q1.

If the output current $I_{L1}$ is allowed to decrease to zero and the charge is developed across the diodes of the rectifier 102, when the low switch Q2 is turned on, the diode charges are reset causing a surge current to flow through the secondary winding of the isolating transformer T1. The surge current flowing through the secondary winding of the isolating transformer T1 causes a corresponding surge current to flow through the primary winding of the isolating transformer T1, resetting the drain to source capacitance and drain to gate capacitance (i.e., C_DS and C_DG) of the low switch Q2 at a higher rate causing more current to flow through the high switch Q1. The increased current through the high switch Q1 causes the high switch Q1 to turn on at the same time as the low switch Q2, thereby damaging the inverter. One method to solve this problem is to operate the buck converter 10 in a continuous current mode and prevent the output current $I_{L1}$ from reaching zero within the intended output range of the isolating buck converter 10.

Equation 1 is the basic definition of the voltage across an inductor.

$$V\_L = \frac{L*dI\_L}{dt} \quad \text{EQUATION 1}$$

To operate in the continuous current mode, the average current through the output inductor L1 (i.e., the output current $I_{L1}$) has to be greater than one half the ripple ($\Delta IL1$) of the load current (I_LOAD) as shown in equation 2.

$$\Delta IL1 > 2*I\_LOAD \quad \text{EQUATION 2}$$

Manipulating equations 1 and 2 with the definitions of equations 3, 4, and 5 results in equation 6.

$$V\_L = V\_IN\_BUCK - V\_LOAD \quad \text{EQUATION 3}$$

$$dt = D*T\_SW = \frac{D}{f\_SW} \quad \text{EQUATION 4}$$

$$D = \frac{V\_LOAD}{V\_IN\_BUCK} \quad \text{EQUATION 5}$$

$$f\_SW > \frac{V\_LOAD*(V\_IN\_BUCK - V\_LOAD)}{2*L*V\_IN*I\_LOAD} \quad \text{EQUATION 6}$$

Equation 6 thus offers different approaches for ensuring continuous current mode operation in the output inductor L1. The input voltage V_IN (i.e., VBULK) can be reduced at the cost of affecting the intended range of operation. The inductance of the output inductor L1 can be increased at the cost of potential saturation and decreased efficiency due to an increase in winding resistance. However, given a particular system of input and output ranges and a particular inductance value for the output inductor L1, the frequency can be shifted according to equation 6 based on either the commanded load voltage V_LOAD or the commanded load current I_LOAD to decrease the output current ripple (i.e., $\Delta I_{L1}$) to a level that is within twice I_LOAD.

There are three ways to achieve these parameters (separately or in various combinations): (1) shift the frequency of the pulse width modulation signal 12 provided to the high switch Q1 and the low switch Q2 by the switch controller 502; (2) employ pulse density modulation to decrease the off-time of the buck converter which will decrease the magnitude of the current ripple $\Delta I_{L1}$, and (3) use a step-gap core (i.e., a swinging choke) for the output inductor L1 that saturates to a lower value of inductance (e.g., less than 2.5 mH) for high load currents and a higher value (e.g., 2.5 mH or more) of inductance at low load currents.

Figure 3:
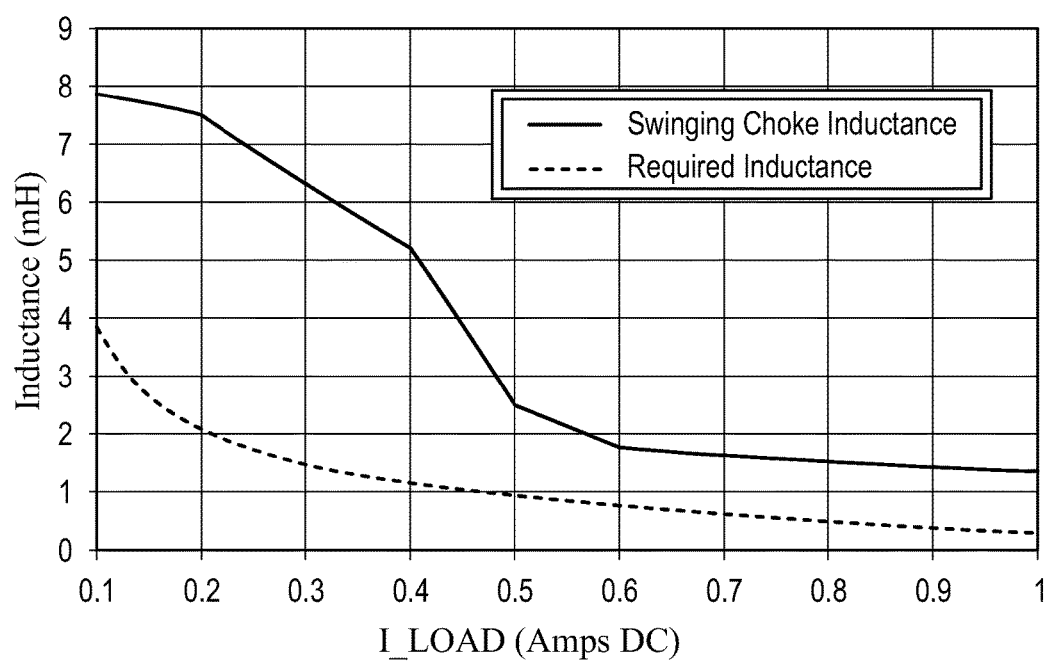
FIG. 3 is a graphical plot of swinging choke inductance and required inductance versus output current for an isolated buck converter.

Referring to FIG. 3, the inductance of an output inductor L1 using a step-gap core that saturates to a lower value of inductance for a high value of load current and a higher value of inductance at low values of load current is plotted versus load current. Different step-gap cores may be selected based on the intended output range of the isolated buck converter 10.

Figure 4:
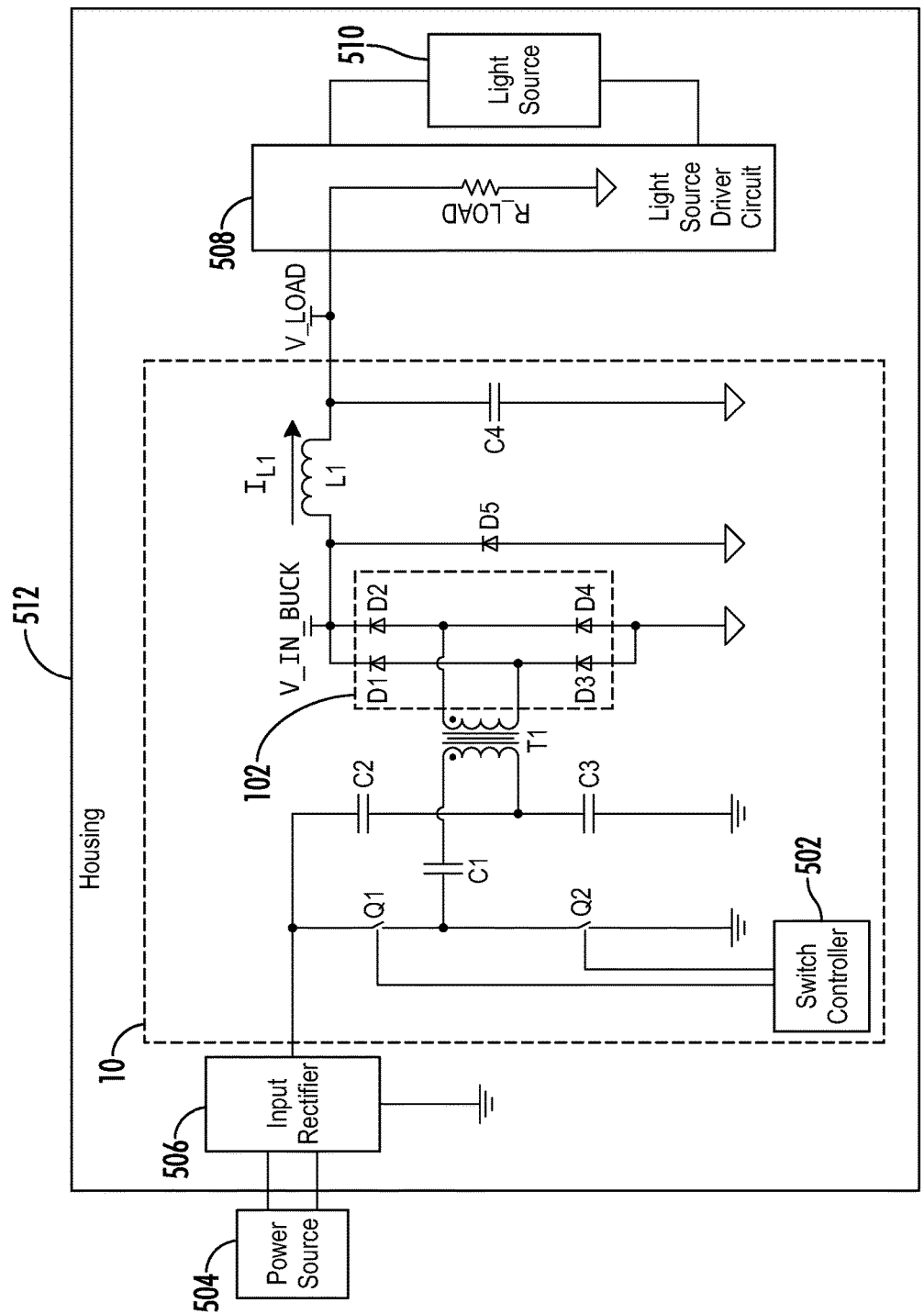
FIG. 4 is a block diagram and partial schematic diagram of a light fixture including an isolated buck converter.

Referring to FIG. 4, a light fixture receives power from a power source 504 and provides light. The fixture includes an input rectifier 506, an isolated buck converter 10, a light source driver circuit 508, a light source 510, and a housing 512. The light source 510 provides light in response to receiving a DC voltage. The housing 512 is connected to (i.e., physically and/or electrically connected to) the input rectifier 506, the isolated buck converter 10, the light source driver circuit 508, and the light source 510. In the illustrated embodiment, the power source 504 is an alternating current (AC) source requiring the input rectifier 506. In other embodiments, the power source 504 may be a DC source such that the input rectifier 506 is not required.

The input rectifier 506 is connected between the power source 504 and the isolated buck converter 10, receives AC power from the power source 504, and provides DC power to the isolated buck converter 10. In one embodiment, the DC output voltage is different from the DC voltage received from the power source 504. Additionally, in the illustrated embodiment, a light source driver circuit 508 is included, but in other embodiments, the light source 510 is driven directly by the isolated buck converter 10. The light source driver circuit is connected between the output inductor L1 and the light source 510 and controls power from the isolated buck converter 10 to the light source 510.

The isolated buck converter 10 receives power from the power source 504 and provides a substantially DC output voltage to the light source 510 (i.e., the load). The isolated buck converter 10 includes a high switch Q1, a low switch Q2, a high bulk capacitor C2, a low bulk capacitor C3, and isolating transformer T1, a full wave rectifier 102, an output inductor L1, and a switch controller 502. The high switch Q1 is connected to the power source 504. The low switch Q2 is connected between the high switch Q1 and a ground of the power source 504. The connection between the high switch Q1 and the low switch Q2 forms a first junction. In one embodiment, the high switch Q1 and the low switch Q2 are MOSFETs.

The high bulk capacitor C2 is connected to the power source 504. The low bulk capacitor C3 is connected between the high bulk capacitor C2 and the ground of the power source 504. The connection between the high bulk capacitor C2 and the low bulk capacitor C3 forms a second junction.

The isolating transformer T1 includes a primary winding and a secondary winding. The primary winding of the isolating transformer T1 is connected between the first junction and the second junction. In one embodiment, the primary winding of the isolating transformer T1 is connected to the first junction via a DC blocking capacitor C1. The isolating transformer T1 isolates the ground of the power source from a ground of the light source 510 (i.e., the load).

The full wave rectifier 102 is connected to the secondary winding of the isolating transformer T1. The output inductor L1 is connected to an output of the full wave rectifier 102. The output inductor L1 provides a DC output voltage to the light source 510.

The output inductor L1 includes a step gap core selected to saturate at a low inductance when the current $I_{L1}$ from the output inductor L1 to the light source 510 (i.e., the load) exceeds a predetermined threshold and provide a higher inductance when the current $I_{L1}$ from the output inductor L1 to the light source 510 (i.e., the load) is less than the predetermined threshold.

The switch controller 502 is connected to the high switch Q1 and the low switch Q2. The switch controller 502 controls the high switch Q1 and the low switch Q2 via pulse width modulation 12 and increases the frequency of the pulse width modulation as the current from the output inductor to the light source 510 (i.e., the load) decreases to operate and maintain the output inductor L1 in a continuous current mode. The switch controller 502 further implements pulse density modulation when the current to the light source 510 (i.e., the load) from the output inductor L1 is less than a predetermined threshold.

In one embodiment, the isolated buck converter 10 further includes a freewheeling diode D5 and a filter capacitor C4. The freewheeling diode D5 is connected in parallel with the rectifier 102. The output filter capacitor C4 is connected in parallel with the light source 510 (i.e., the load) at an output of the output inductor L1. The freewheeling diode D5 and the output filter capacitor C4 are connected to a ground of the rectifier 102.

It will be understood by those of skill in the art that information and signals may be represented using any of a variety of different technologies and techniques (e.g., data, instructions, commands, information, signals, bits, symbols, and chips may be represented by voltages, currents, electromagnetic waves, magnetic fields or particles, optical fields or particles, or any combination thereof). Likewise, the various illustrative logical blocks, modules, circuits, and algorithm steps described herein may be implemented as electronic hardware, computer software, or combinations of both, depending on the application and functionality. Moreover, the various logical blocks, modules, circuits, and controllers described herein may be implemented or performed with a general purpose processor (e.g., microprocessor, conventional processor, controller, microcontroller, state machine or combination of computing devices), a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. Similarly, steps of a method or process described herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. Although embodiments of the present invention have been described in detail, it will be understood by those skilled in the art that various modifications can be made therein without departing from the spirit and scope of the invention as set forth in the appended claims.

A controller, computing device, or computer, such as described herein, includes at least one or more processors or processing units and a system memory. The controller may also include at least some form of computer readable media. By way of example and not limitation, computer readable media may include computer storage media and communication media. Computer readable storage media may include volatile and nonvolatile, removable and non-removable media implemented in any method or technology that enables storage of information, such as hard coding, computer readable instructions, data structures, program modules, or other data. Communication media may embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

It will be understood that the particular embodiments described herein are shown by way of illustration and not as limitations of the invention. The principal features of this invention may be employed in various embodiments without departing from the scope of the invention. Those of ordinary skill in the art will recognize numerous equivalents to the specific procedures described herein. Such equivalents are considered to be within the scope of this invention and are covered by the claims.

All of the compositions and/or methods disclosed and claimed herein may be made and/or executed without undue experimentation in light of the present disclosure. While the compositions and methods of this invention have been described in terms of the embodiments included herein, it will be apparent to those of ordinary skill in the art that variations may be applied to the compositions and/or methods and in the steps or in the sequence of steps of the method described herein without departing from the concept, spirit, and scope of the invention. All such similar substitutes and modifications apparent to those skilled in the art are deemed to be within the spirit, scope, and concept of the invention as defined by the appended claims.

Thus, although there have been described particular embodiments of the present invention of Reducing Output Ripple Current and Protecting Inverter Switches During Non-Zero Voltage Swiching of Isolated Buck Converters, it is not intended that such references be construed as limitations upon the scope of this invention except as set forth in the following claims.

What is claimed is:

1. An isolated buck converter operable to receive a direct current (DC) voltage from a power source and provide a substantially DC output voltage to a load, said isolated buck converter comprising:
   a high switch connected to the power source;
   a low switch connected to the high switch and a ground of the power source, the connection between the high switch and the low switch forming a first junction;
   a high bulk capacitor connected to the power source;
   a low bulk capacitor connected to the high bulk capacitor and to the ground of the power source, the connection between the high bulk capacitor and the low bulk capacitor forming a second junction;
an isolating transformer having a primary winding and a secondary winding, wherein the primary winding is connected between the first junction and the second junction;
a rectifier connected to the secondary winding of the isolating transformer;
an output inductor connected to an output of the rectifier, wherein the output inductor is configured to provide the DC output voltage to the load; and
a switch controller connected to the high switch and to the low switch, wherein said switch controller is configured to
control the high switch and the low switch via pulse width modulation, and
increase a frequency of the pulse width modulation as a current from the output inductor to the load decreases to operate the output inductor in a continuous current mode.

2. The isolated buck converter of claim 1, wherein the output inductor comprises a step-gap core selected to saturate at a low inductance when the current from the output inductor to the load exceeds a predetermined threshold and to provide a high inductance when the current from the output inductor to the load is less than the predetermined threshold.

3. The isolated buck converter of claim 1, wherein the switch controller is further configured to implement pulse density modulation when the current to the load from the output inductor is less than a predetermined threshold.

4. The isolated buck converter of claim 1, wherein:
the high switch is a MOSFET;
the low switch is a MOSFET; and
the rectifier is a full wave rectifier.

5. The isolated buck converter of claim 1, wherein the ground of the power source is isolated from a ground of the load.

6. The isolated buck converter of claim 1, wherein the DC output voltage is different from the DC voltage received from the power source.

7. The isolated buck converter of claim 1, further comprising:
a freewheeling diode connected in parallel with the rectifier;
a filter capacitor connected in parallel with the load; and
a DC blocking capacitor connected between the primary winding of the isolating transformer and the first junction.

8. An isolated buck converter operable to receive a direct current (DC) voltage from a power source and provide a substantially DC output voltage to a load,
said isolated buck converter comprising:
a high switch connected to the power source;
a low switch connected to the high switch and a ground of the power source, wherein the connection between the high switch and the low switch forms a first junction;
a high bulk capacitor connected to the power source;
a low bulk capacitor connected to the high bulk capacitor and the ground of the power source, wherein the connection between the high bulk capacitor and the low bulk capacitor forms a second junction;
an isolating transformer having a primary winding and a secondary winding, wherein the primary winding is connected between the first junction and the second junction;
a rectifier connected to the secondary winding of the isolating transformer;
an output inductor connected to an output of the rectifier, wherein the output inductor is configured to provide the DC output voltage to the load;
the output inductor further comprises a step-gap core selected to saturate at a low inductance when the current from the output inductor to the load exceeds a predetermined threshold and to provide a high inductance when the current from the output inductor to the load is less than the predetermined threshold; and
a switch controller connected to the high switch and the low switch, said switch controller configured to control the high switch and the low switch via pulse width modulation, wherein the switch controller is further configured to increase a frequency of the pulse width modulation as a current from the output inductor to the load decreases to operate the output inductor in a continuous current mode.

9. The isolated buck converter of claim 8, wherein the switch controller is further configured to implement pulse density modulation when the current to the load from the output inductor is less than a predetermined threshold.

10. The isolated buck converter of claim 8, wherein:
the high switch is a MOSFET;
the low switch is a MOSFET; and
the rectifier is a full wave rectifier.

11. The isolated buck converter of claim 8, wherein the ground of the power source is isolated from a ground of the load.

12. The isolated buck converter of claim 8, wherein the DC output voltage is different from the DC voltage received from the power source.

13. The isolated buck converter of claim 8, further comprising:
a freewheeling diode connected in parallel with the rectifier;
a filter capacitor connected in parallel with the load; and
a DC blocking capacitor connected between the primary winding of the isolating transformer and the first junction.

14. A light fixture operable to receive power from a power source and provide light, said light fixture comprising:
a light source functional to provide light in response to receiving a direct current (DC) voltage;
an isolated buck converter configured to receive power from the power source and provide a substantially DC output voltage to the light source;
the isolated buck converter comprising
a high switch connected to the power source,
a low switch connected to the high switch and a ground of the power source, wherein the connection between the high switch and the low switch forms a first junction,
a high bulk capacitor connected to the power source,
a low bulk capacitor connected to the high bulk capacitor and the ground of the power source, wherein the connection between the high bulk capacitor and the low bulk capacitor forms a second junction,
an isolating transformer having a primary winding and a secondary winding, wherein the primary winding is connected between the first junction and the second junction,
a rectifier connected to the secondary winding of the isolating transformer;

an output inductor connected to an output of the rectifier, wherein the output inductor is configured to provide the DC output voltage to the light source, the output inductor further comprises a step-gap core selected to saturate at a low inductance when the current from the output inductor to the light source exceeds a predetermined threshold and provide a high inductance when the current from the output inductor to the light source is less than the predetermined threshold, and a switch controller connected to the high switch and the low switch, said switch controller configured to control the high switch and the low switch via pulse width modulation, and increase a frequency of the pulse width modulation as a current from the output inductor to the light source decreases to operate the output inductor in a continuous current mode; and a housing connected to the light source and the isolated buck converter.

15. The light fixture of claim 14, further comprising:
an input rectifier connected between the power source and the isolated buck converter, wherein the input rectifier is configured to receive alternating current (AC) power from the power source and provide DC power to the isolated buck converter; and
a light source driver circuit connected between the output inductor and the light source, wherein the light source driver circuit is configured to receive the substantially DC output voltage from the isolated buck converter and control power to the light source.

16. The light fixture of claim 14, wherein the switch controller is further configured to implement pulse density modulation when the current to the light source from the output inductor is less than a predetermined threshold.

17. The light fixture of claim 14, wherein:
the high switch is a MOSFET;
the low switch is a MOSFET; and
the rectifier is a full wave rectifier.

18. The light fixture of claim 14, wherein the ground of the power source is isolated from a ground of the light source, and wherein the DC output voltage is different from the DC voltage received from the power source.

19. The light fixture of claim 14, wherein the isolated buck converter further comprises:
a freewheeling diode connected in parallel with the rectifier;
a filter capacitor connected between an output of the output inductor and a ground of the freewheeling diode; and
a DC blocking capacitor connected between the primary winding of the isolating transformer and the first junction.

20. The isolated buck converter of claim 1, wherein said switch controller is further configured to cause an average current through the output inductor to be greater than one half of a ripple current from the output inductor to the load.

* * * * *